United States Patent [19]

Nakagima

[11] 4,339,363

[45] Jul. 13, 1982

[54] COMPOSITE MATERIAL COMPOSITIONS USING WASTEPAPER AND METHOD OF PRODUCING SAME

[75] Inventor: Yoshikazu Nakagima, Musashino, Japan

[73] Assignee: Kabushiki Kaisha Mikuni Seisakusho, Tokyo, Japan

[21] Appl. No.: 144,302

[22] Filed: Apr. 28, 1980

Related U.S. Application Data

[62] Division of Ser. No. 54,685, Jul. 5, 1979, Pat. No. 4,279,790.

[51] Int. Cl.³ ............................................... C08L 1/02
[52] U.S. Cl. .................................. 524/34; 264/117; 264/118; 264/122; 264/126; 427/212; 427/288; 427/326; 524/35
[58] Field of Search ............... 260/17.4 R, 17.4 CL, 260/37 R, 42.14; 264/117, 118, 122, 126; 427/212, 288, 314, 326

[56] References Cited

U.S. PATENT DOCUMENTS 2,416,888  3/1947  Wentworth .................... 264/118
3,969,314  7/1976  Grigull ........................... 260/37 R
4,225,640  9/1980  Erb ................................. 264/122
4,228,116  10/1980  Colombo et al. ............. 264/122

*Primary Examiner*—John Kight, III
*Assistant Examiner*—Nathan M. Nutter
*Attorney, Agent, or Firm*—C. O. Marshall, Jr.

[57] ABSTRACT

This invention provides composite material compositions comprising wastepaper, a thermoplastic resin and/or other additive(s), said compositions having higher heat resistance, flame retardancy and mechanical strength and smaller linear shrinkage in molding than the conventional compositions of synthetic resins alone or blended with woodmeal or an inorganic filler. There is also provided a method of producing said compositions comprising a wastepaper crushing step, a step of mixing crushed wastepaper with a thermoplastic resin and/or other additive(s) while drying said wastepaper, a blend melting step, a blend kneading step and a blend granulating step. In an embodiment of this invention, scraps of moldings from the composite material compositions using wastepaper may be mixed with wastepaper, a thermoplastic resin and/or other additive(s) and similarly treated and molded into a new composition.

6 Claims, No Drawings

COMPOSITE MATERIAL COMPOSITIONS USING WASTEPAPER AND METHOD OF PRODUCING SAME

This is a division of application Ser. No. 054,685 filed July 5, 1979, now U.S. Pat. No. 4,279,790.

BACKGROUND OF THE INVENTION

1. Field of the Invention

This invention relates to a composite material composition using wastepaper obtained by first crushing wastepaper with no pretreatment and then mixing it with a thermoplastic resin, and a method of producing such composition.

2. Description of the Prior Art

Heretofore, synthetic resin either added or non-added with an inorganic filler or woodmeal and compressed boards using regenerated wastepaper have been available as boarding material for interior parts of automobiles.

However, synthetic resin moldings are generally unsuited for use as interior parts of automobiles because of poor heat resistance and flame retardancy.

The woodmeal-incorporated synthetic resins had problems in mechanical strength such as tensile strength, bending modulus of elasticity, bending strength and impact strength.

In the case of synthetic resins added with an inorganic filler such as talc, calcium carbonate, etc., for improving said defective properties of said angle synthetic resins or woodmeal-incorporated synthetic resins, although heat resistance and flame retardancy as well as mechanical strength are improved, linear shrinkage in molding of such resins (0.8-1.5%) is not much different from that of the normal synthetic resins (1-2%), so that the molded parts therefrom, particularly those exceeding 1,000 mm in length such as for example front boards for automobiles, are elevated in dimensional tolerance to discommode mating or combined use of moldings.

As for the compressed boards utilizing regenerated wastepaper, they are variable in water content as they absorb moisture in the air, and they are also subject to extention or shrinkage in accordance with change of water content, resulting in irregular deformations such as warp or torsion. Further, such compressed boards, as compared with synthetic resins, have a certain limitation in bending or drawing work and are unable to make the moldings with an intricate configuration.

Generally, such compressed boards have been produced by first beating wastepaper in water, subjecting the beaten wastepaper to a paper-making process, drying the thus processed wastepaper and then subjecting dried wastepaper to compression molding. According to this method, large-sized equipments must be prepared for performing such beating, paper processing and drying, and naturally high equipment costs are required therefor. Also, a large volume of industrial water is required for beating and paper processing of wastepaper, and this necessitates an anti-pollution equipment for treating waste water released from said processes.

SUMMARY OF THE INVENTION

This invention has for its object to provide a composite material composition by utilizing wastepaper such as old newspapers, corrugated board papers, cardboard papers, their scraps etc., which are junked in huge volume every day, so as to contribute to saving of pulp resources as well as saving of petroleum resources by lessening the rate of use of petroleum-derived resins for said type of compositions.

It is intended to provide principally a composite material composition using wastepaper which composition has the properties suited for use as automobile parts material.

It is also an object of this invention to provide a composite material composition using wastepaper which composition is free of the defects on heat resistance and flame retardancy of synthetic resins, mechanical strength of woodmeal-blended synthetic resins and linear shrinkage in molding of inorganic filler-incorporated synthetic resins.

It is another object of this invention to provide a composite material composition using wastepaper which composition does not absorb moisture in the air like the compressed boards using regenerated wastepaper and hence keeps free of deformation such as warp or torsion after molding, and also has a same degree of moldability as normal synthetic resins.

In order to attain these objects, the composite material composition according to this invention is constituted by adding about 70 to about 150 parts by weight of a thermoplastic resin to 100 parts by weight of wastepaper. The composition may be suitably added with synthetic or natural rubber, an inorganic filler or other additives so as to provide the composition with the properties that suit the use of the moldings.

It is also envisaged in this invention to provide a method of producing a composite material composition using wastepaper which method unnecessitates the steps of beating, paper processing and drying which require a great volume of industrial water.

It is also an object of this invention to provide a method of producing a composite material composition using wastepaper in a short time and with high efficiency by using only a few equipments for crushing of wastepaper, mixing and granulation of the blend.

In order to accomplish these objects, there is provided according to this invention a method of producing a composite material composition using wastepaper which method comprises a wastepaper crushing step, a mixing and drying step in which crushed wastepaper, a thermoplastic resin and/or other additives are mixed under stirring at high speed in a mixer while water contained in wastepaper is removed by frictional heat generated during said mixing to dry the mixture, a melting step in which high-speed stirring is further continued in the mixer to develop frictional heat thereby to melt the thermoplastic resin and additives, a kneading step in which high-speed stirring is still continued in the mixer to beat wastepaper in the melt phase so that wastepaper is impregnated with the melt, and a granulation step in which the kneaded composition is granulated. This production method may further comprise preheating of the mixer for allowing prosecution of the process in a shorter period of time with higher efficiency, incorporation of a nucleation step between the kneading and granulation steps, and employment of a controlling means.

The method of this invention can be applied for producing a new composite material composition from used material by pulverizing the scraps of the moldings from the composition of this invention and adding the pulverized material to the mixture of wastepaper, thermoplastic resin and/or additives.

DESCRIPTION OF THE PREFERRED EMBODIMENTS

The composite material composition according to this invention comprises 100 parts by weight of wastepaper and about 70 to about 150 parts by weight of a thermoplastic resin. The wastepaper used here is, for example, newspaper, corrugated board paper, cardboard paper and scraps thereof. Any sort of paper that is available in bulk at low cost may be used. Such wastepaper may be used with no such pretreatment as washing, tempering or drying. Therefore, the wastepaper, when used, may contain a size, filler, pigment, ink and other like substances. It also contains moisture of usually about 10 to 15% when it is in an equilibrium state. Since wastepaper with a large size requires much time for mixing and milling with the thermoplastic resin and other additives, wastepaper is usually crushed to small pieces with a size of less than 30 mm, preferably about 5 mm and then mixed and milled with the resin, etc.

The thermoplastic resin used in this invention may be of any type if it is in the form of a thermoplastic polymer. Examples of such thermoplastic resins are polyethylene, polypropylene, ethylene/propylene copolymer, polybutene, polyvinyl chloride, polyvinyl acetate, polymethacrylic acid esters (particularly methyl esters), polyacrylic acid esters and polystyrene. These thermoplastic resins may be used singly, or they may be used in combination for imparting the properties that suit the intended use of the moldings. Also, the thermoplastic resin used in the process of this invention may be in the form of either pellets or powder. The mixing ratio of the thermoplastic resin may be suitably selected within the range of about 70 to about 150 parts by weight per 100 parts by weight of wastepaper. If the amount of the thermoplastic resin mixed exceeds about 150 parts by weight, the properties of the resultantly produced composition approximate to those of the thermoplastic resin per se, resulting in poor heat resistance and flame retardancy. On the other hand, if the amount of the thermoplastic resin mixed is less than about 75 parts by weight, mechanical strength, particularly impact strength, of the resultant composition is excessively lowered. For this reason, the most preferred mixing ratio of thermoplastic resin to wastepaper is 100:100 parts by weight .

The composite material composition using wastepaper according to this invention may be blended with an additive or additives to provide the properties that are required of the moldings. Generally, if the mixing ratio of thermoplastic resin to wastepaper is lessened, mechanical strength (impact strength) of the moldings is deteriorated. In order to overcome such problem, synthetic or natural rubber may be added in an amount of up to 20 parts by weight, together with about 70 to about 150 parts by weight of a thermoplastic resin, to 100 parts by weight of wastepaper. Addition of such rubber leads to a marked improvement of impact strength of the composition. Synthetic rubber used for this purpose may be suitably selected from the thermoplastic synthetic rubbers such as styrene rubber, polybutadiene rubber, butyl rubber, nitrile rubber, ethylene/propylene rubber and ethylene/vinyl acetate rubber. Such synthetic or natural rubber may be used in the form of either pellets or powder. Also, such rubber may be previously blended with a thermoplastic resin and used in the form of a compound.

In order to further improve impact strength of the composition, an inorganic filler may be blended in an amount of up to 25 parts by weight to 100 parts by weight of wastepaper, about 50 to 150 parts by weight of a thermoplastic resin and up to 20 parts by weight of synthetic or natural rubber. Such inorganic filler may be calcium carbonate, talc, calcium sulfate, barium sulfate or the like.

It is also possible to blend stearic acid as lubricant so as to improve compatibility of wastepaper with thermoplastic resin and/or other additives to facilitate mixing and kneading thereof and to thereby further improve the properties of the moldings.

We will now describe the method of producing the composite material composition using wastepaper that has been discussed above.

In the following description, the term "materials" refers to wastepaper, thermoplastic resin and/or other additives. Also, the term "thermoplastic substances" refers to thermoplastic resins and other thermoplastic materials in general, such as synthetic rubber among the additives.

First, wastepaper is crushed into small pieces with size of less than 30 mm in the wastepaper crushing step for allowing efficient mixing and kneading of the wastepaper, thermoplastic resin and/or other additive(s). Such crushing of wastepaper may be effected in various ways. For example, wastepaper is first cut longitudinally and crosswise by a cutter and then the thus cut paper is crushed by a mill. This method is favorable as it allows obtainment of crushed pieces at high efficiency.

Then the crushed pieces of wastepaper are mixed with a thermoplastic resin and/or other additive(s) in a mixer. In this case, the thermoplastic resin, synthetic or natural rubber and an inorganic filler may be fed into the mixer independently in the form of pellets or powders, or all of these materials may be previously compounding and then fed into the mixer. As the materials are thus supplied into the mixer, they are then agitated therein at high speed, whereby the materials are mixed up well and at the same time the water content of wastepaper is reduced to about 0.3 to 1.0% by dint of frictional heat that is generated during said mixing, thus effecting drying of wastepaper.

As high-speed agitation of the materials in the mixer is further continued, the temperature in the mixer is raised by the frictional heat of mixing to a thermoplastic substance melting temperature, whereupon the thermoplastic substances begin to melt. Heating of the materials in the mixer is effected by said frictional heat until reaching the melt starting temperature, but since heating by such frictional heat alone takes much time for raising the temperature from ambient to melt starting temperature, it is recommended to preheat the mixer by using a heating medium to a temperature suited for drying of wastepaper and then effect further drying of wastepaper and melting of the thermoplastic substances by frictional heat of the materials. This can appreciably shorten the production time.

When high-speed stirring of the materials in the mixer is further continued, wastepaper begins to beat in the melted thermoplastic substances to effectuate kneading of wastepaper, thermoplastic resin and other additives. This kneading should not be continued for a long time because otherwise the material temperature in the mixer elevates so high as to cause thermal decomposition of wastepaper, etc., in the materials. Also, too long time of beating and kneading excessively promotes beating of wastepaper, resulting in reduced mechanical strength of the composition moldings.

Then the kneaded mass of materials is granulated by using a known granulator to form a composite material composition. Molding of this composition into a form of use may be accomplished by using a known molding means. For example, said composition can be molded by a vented injection molding machine in the same way as molding of an ordinary thermoplastic resin.

In a preferred mode of practice of this invention, stirring in the mixer is decelerated to a medium speed for a short period of time upon completion of material kneading and then stirring of the materials is further continued to effectuate nucleation in the early stage of granulation. This can reduce the time required for the next granulation step.

No waste of material is suffered if the scraps of the moldings from said composition are again crushed into powder and mixed in the fresh feed of materials.

Now, the composite material composition using wastepaper according to this invention and the method of producing such composition are described in further detail by way of the embodiments thereof.

Described first is a preferred example of the composition production method according to this invention.

First, old newspapers, (wastepaper) are cut into square pieces with size of 7 cm×7 cm, and the cut pieces of newspaper are further crushed into smaller pieces by a turbo-mill. Only those of the finely cut newspaper pieces which have passed a 5 mm×5 mm mesh screen are used as wastepaper material for the process. Used in the process of this example are 42.5 kg of the thus obtained newspaper cut pieces, 34 kg of ethylene-propylene copolymer resin as thermoplastic resin, 4.25 kg of high-density polyethylene resin, 4.25 kg of ethylene-propylene rubber and 0.04 kg of 2,6-di-t-butyl-4-methylphenol (BHT) as antioxidant (these materials are hereinafter referred to as blend). This blend is supplied into a mixer which has been previously heated to 75°–80° C. by a heating medium, and then is stirred therein at the rate of 1,060 r.p.m. continuously for about 25 minutes. Thus, the interior of the mixer is initially kept at said preheating temperature 75°–80° C., but as the blend with a lower temperature than such preheating temperature is supplied into the mixer, the temperature therein drops temporarily. However, since the blend is stirred at high speed in the mixer, the temperature in the mixer begins to rise up 5 minutes after start of stirring owing to frictional heat which is generated by mixing of the blend materials. Such rise of temperature takes place slowly until moisture in wastepaper in the blend is driven away to effect sufficient drying thereof. When drying of wastepaper in the blend is substantially completed, there takes place more sharp rise of intra-mixer temperature by dint of frictional heat, and when the temperature in the mixer reaches 162° C., the thermoplastic substances in the blend begin to melt. 20 minutes was required until such melting began from start of stirring. Melting of the thermoplastic substances causes sharp increase of the blend viscosity, so that frictional heat is generated successively by the continued agitation to effect perfect melting of the thermoplastic substances. As the thermoplastic substances are thus melted, wastepaper is beaten in the melt phase. In this condition, beaten wastepaper and molten thermoplastic substances (which rope) are kneaded while further promoting beating of wastepaper and causing impregnation of the thermoplastic substances in beaten wastepaper. If stirring is further continued for a long time, the temperature in the mixer elevates exceedingly to give rise to an unfavorable situation such as carbonization of the wastepaper component in the blend, so that this kneading step was switched to the next nucleation step upon passage of about 25 minutes after start of stirring in the mixer. In the above-described process, the load current of the mixer motor is around 200 A at the stage where mixing and drying of the blend has been completed, but said load current begins to increase with start of melting of the thermoplastic substances in the blend and the viscosity of the blend rises up in accordance with advancement of melting, causing further increase of the load current of the mixer motor. When the load current of said mixer motor has reached about 250 A, control of proceeding to the next nucleation step was performed. The blend temperature at the time of proceeding to the nucleation step was 180°–190° C. In the next nucleation step, additional stirring was carried out for 6–7 minutes by dropping the stirring rate to 530 r.p.m. This has initiated formation of clusters of small particles of the kneaded blend (early phase of granulation). The blend temperature upon completion of this nucleation step was 225° C. After completion of this nucleation step, the blend was transferred into another mixer which had been water-cooled to about 20° C., and further subjected to additional 15-minute stirring at the rate of 100 r.p.m., whereby the blend was formed into particles with diameter of approximately 2–3 mm, with temperature thereof being down to 70° C. The thus granulated blend may be molded into a desired form of use by a vented injection molding machine in the same way as molding of an ordinary synthetic resin.

The moldings obtained from the above-described composite material composition according to this invention had the properties shown in the following table. In Example 1, a composite material composition was prepared according to the above-described method by using 42.5 kg of wastepaper, 34 kg of ethylene-propylene copolymer resin, 4.25 kg of high-density polyethylene resin, 4.25 kg of ethylene-propylene rubber and 0.04 kg of BHT, and a molding was formed from such composition. In Example 2, a similar composition was prepared in the similar way by using 25.5 kg of wastepaper, 40.8 kg of ethylene-polypropylene copolymer resin, 5.1 kg of high-density polyethylene resin, 5.1 kg of ethylene-propylene rubber, 8.5 kg of calcium carbonate, 0.2 kg of stearic acid and 0.05 kg of BHT. In Comparative Example 1, a molding was formed from a blend consisting of 80 kg of ethylene-propylene copolymer resin, 10 kg of high-density polyethylene resin, 10 kg of ethylene-propylene rubber and 0.1 kg of BHT. The composition of Comparative Example 1 is same as that of Example 1 from which wastepaper was excluded. In Comparative Example 2, a composition was prepared by using 3 parts by weight of a thermoplastic resin and 2 parts by weight of talc. Thus, it shows the properties of a composition in which an inorganic filler is incorporated.

In Comparative Example 3, a composition was prepared according to Example 1 without using wastepaper but by using instead woodmeal crushed to the size of less than 30 meshes. The burning rate in the table was measured according to the U.S. Federal Motor Vehicle Safety Standards.

| Test items (unit) | Test conditions | Testing method ASTM | Example 1 | Example 2 | Comparative Example 1 | Comparative Example 2 | Comparative Example 3 |
|---|---|---|---|---|---|---|---|
| Specific gravity | | D-792 | 1.13 | 1.10 | 0.905 | 1.22 | 1.10 |
| Linear shrinkage of molding (%) | | | 0.28 | 0.35 | 1.0–2.0 | 0.8–1.2 | 0.8 |
| Tensile strength (kg/cm$^2$) | | D-638 | 300 | 270 | 240 | 350 | 175 |
| Elongation (%) | | D-638 | 4 | 6 | 340 | 10 | 4 |
| Bending modulus of elasticity ($10^4 \times$ kg/cm$^2$) | | D-790 | 3.3 | 2.7 | 0.9 | 4.5 | 2.5 |
| Bending strength (kg/cm$^2$) | | D-790 | 420 | 400 | 240 | 450 | 282 |
| Hardness (R scale) | | D-785 | 83 | 77 | 70 | 105 | 80 |
| Impact strength (kg-cm/cm$^2$) | 23° C., notched | D-256 | 3.4 | 4.0 | 30 | 2.0 | 3.0 |
| Melting point (°C.) | | | 163 | 163 | 162 | 174 | 163 |
| Thermal deformation temp. (°C.) | 4.6 kg/cm$^2$ | D-648 | 135 | 130 | 90 | 140 | 132 |
| Burning rate (mm/min) | | FMVSS 302 (early phase) | 33 | 41 | 60 | 54 | 45 |

What is claimed is:

1. A method of producing a granular molding composition that provides substantially reduced linear shrinkage and excellent mechanical strength, comprising the steps of cutting wastepaper into pieces of a size less than 30 mm., stirring 100 parts by weight of the wastepaper at high speed in a mixer with about 70 to 150 parts by weight of the thermoplastic resin to drive off moisture from the wastepaper, and to melt the thermoplastic resin, continuing high speed stirring to beat and knead the cut wastepaper with the molten resin and thereby impregnate the cut wastepaper with the molten resin, and then granulating the composition.

2. A method of claim 1, wherein the wastepaper cutting step comprises cutting wastepaper by a cutter and then crushing the cut wastepaper by a mill.

3. A method of claim 2, wherein the mixer used in the mixing and drying step and the melting step is preheated by a heating medium.

4. A method of claim 3, wherein before the kneading step is switched into the granulation step, the stirring rate of the mixer is reduced to a medium level for a short time after completion of the kneading step, to nucleate the material, and the granulation step is then started.

5. A method of claim 4, wherein the kneading step is switched into the nucleation step before carbonization of the wastepaper component occurs.

6. A method of claim 5, wherein the scraps of moldings formed from a composition of this invention are crushed into powder and mixed with wastepaper, a thermoplastic resin and/or other additive(s) and then subjected to the described steps in a mixer.

* * * * *